United States Patent [19]

Dong

[11] Patent Number: 5,349,138
[45] Date of Patent: Sep. 20, 1994

[54] FOOD WEIGHT SENSING DEVICE FOR MICROWAVE OVEN

[75] Inventor: Eun S. Dong, Busan, Rep. of Korea

[73] Assignee: Goldstar Co., Ltd., Seoul, Rep. of Korea

[21] Appl. No.: 47,208

[22] Filed: Apr. 16, 1993

[30] Foreign Application Priority Data

Apr. 21, 1992 [KR] Rep. of Korea ............... 6616/1992

[51] Int. Cl.$^5$ .................... G01G 19/52; G01G 3/14
[52] U.S. Cl. .................... 177/144; 177/210 C; 177/245
[58] Field of Search .................... 177/144, 210 C, 245

[56] References Cited

U.S. PATENT DOCUMENTS

| | | | |
|---|---|---|---|
| 4,676,328 | 6/1987 | Morino | 177/144 |
| 4,825,967 | 5/1989 | Sakamoto et al. | 177/210 C |
| 4,899,600 | 2/1990 | Lee | 177/210 C X |
| 4,970,374 | 11/1990 | Ueda et al. | 177/210 C X |

*Primary Examiner*—George H. Miller, Jr.
*Attorney, Agent, or Firm*—Birch, Stewart, Kolasch & Birch

[57] ABSTRACT

A food weight sensing device for a microwave oven, which comprises a fixed electrode plate and a movable electrode plate which vary in overlapping area, according to a vertical movement of a movable spacer caused by the weight of a food to be measured. A capacitance signal indicative of the variation in overlapping area is converted into a frequency signal, so as to sense precisely the weight of food. The device comprises a fixed spacer, a movable spacer being movable with respect to the fixed spacer, a pair of plate springs disposed between the spacers, a weight sensing fixed member fixedly mounted beneath a base plate of the microwave oven and having a vertically extending actuating chamber opened at one end thereof, a fixed electrode disposed in the actuating chamber and having a fixed electrode plate being attached to an inner surface of the weight sensing fixed member defining the actuating chamber, and a movable electrode fixedly mounted at its lower portion to the movable spacer and having a movable electrode plate being vertically movable through the actuating chamber while maintaining a parallel state with the fixed electrode plate.

6 Claims, 5 Drawing Sheets

FOOD WEIGHT SENSING DEVICE FOR MICROWAVE OVEN

BACKGROUND OF THE INVENTION

1. Field of the Invention

The present invention relates to a device for sensing a weight of food products in a microwave oven, and more particularly to a food weight sensing device utilizing a variation in capacitance depending on a variation in overlapping area between electrode plates.

2. Description of the Prior Art

As conventional weight sensing methods, there have been known a method utilizing a capacitance, a method utilizing a differential transformer and a method utilizing piezoelectric elements and a method utilizing a strain gauge.

From these methods, the method utilizing the capacitance is mainly applied to microwave ovens. For measuring the weight of an object (namely, the food), this method utilizes the following equation (1):

$$C = \epsilon A / d \tag{1}$$

wherein, C represents a capacitance, $\epsilon$ a dielectric constant, A the area of electrode plates, and d the distance between the electrode plates.

A process of measuring the weight of an object by using the equation (1) is carried out as follows.

When an object is laid on a tray of a microwave oven, it applies its weight to the tray, thereby causing the distance d between electrode plates expressed by the equation (1) to be varied. Due to such a variation, the capacitance C is varied.

Microwave ovens measure the weight of an object, using the above-mentioned principle.

Now, a conventional capacitance type weight sensing device using the above-mentioned principle will be described, in conjunction with FIG. 1.

FIG. i is a sectional view of the capacitance type weight sensing device adapted to a conventional microwave oven. As shown in FIG. 1, the device comprises a base plate 101 to which a L-shaped bracket 102 is fixedly mounted. A fixed spacer 103 of a 90°-turned U shape is fixedly mounted to the upper portion of the bracket 102. To the fixed spacer 103, a movable spacer 105 of a 270°-turned U shape is connected by means of upper and lower parallel plate springs 104a and 104b, so as to face the fixed spacer 103.

The plate springs 104a and 104b serve as cantilevers permitting the movable spacer 105 to move vertically within a predetermined distance, with respect to the fixed spacer 103, that is, the fixed support.

To the movable spacer 105 is fixedly mounted a load bracket 106 which has an inverted L shape. A tray 108 is mounted to the upper portion of the load bracket 106.

Beneath the fixed spacer and movable spacer 103 and 105, a pair of electrode plates 107a and 107b defining a predetermined space therebetween are mounted to the fixed spacer and movable spacer 103 and 105, by means of proper support members, respectively.

Operation of the device with the above-mentioned construction will now be described.

As an object is laid on the tray 108, the plate springs 104a and 104b fixed to the fixed spacer 103 in a cantilever manner are downwardly bent due to the weight of object such that their free ends spaced away from the fixed spacer 103 move downwardly. Accordingly, the electrode plate 107b fixed to the movable spacer 105 which is fixed to the free ends of the plate springs 104a and 104b moves downwardly, so that it moves away from the electrode plate 107a. As a result, the distance between the electrode plates 107a and 107b varies, thereby causing the capacitance C to vary.

Thus, the weight of object can be measured, using such a variation in capacitance.

However, the above-mentioned conventional capacitance type weight sensing device involves the following problems.

First, the variation of the distance d between electrode plates caused by the weight of an object to be measured is achieved within a narrow range, thereby causing the variation in capacitance to be also achieved within a narrow range. As a result, it is difficult to achieve a precise measurement.

Second, overall size of the device is undesirably large, since the electrode plates 107a and 107b have a large size of, for example, 100 mm × 100 mm.

Third, since the plate electrodes 107a and 107b are exposed to external, there is a problem of an error in measurement caused by variations in environmental factors such as dust, temperature and humidity.

SUMMARY OF THE INVENTION

Therefore, an object of the invention is to provide a food weight sensing device for a microwave oven, which is of a compact construction comprising a fixed electrode and a movable electrode constructed to be protected from external, thereby preventing a malfunction caused by external factors and enabling a precise measurement.

In accordance with the present invention, this object can be accomplished by providing a food weight sensing device for a microwave oven comprising: a fixed spacer fixedly mounted beneath a base plate of said microwave oven at one side of said base plate, by a bracket fixed to the base plate; a movable spacer fixedly mounted to a load supporting bracket supporting a tray of the microwave oven such that it is horizontally spaced a predetermined distance from said fixed spacer, to face the fixed spacer, said movable spacer being vertically movable due to the weight of an object laid on said tray for measuring the weight and having a horizontal supporting member extending from its lower portion; resilience means disposed between the fixed spacer and the movable spacer and adapted to apply a resilience force to the movable spacer against said vertical movement of the movable spacer; and variable weight sensing means having a pair of overlapping electrode plates and disposed between said bracket for supporting the fixed spacer and said horizontal supporting member such that an overlapping area between said electrode plates is varied, depending on the vertical movement of the movable spacer, said variable weight sensing means being adapted to sense the weight of said object, based on a capacitance value obtained by the variation in overlapping area.

BRIEF DESCRIPTION OF THE DRAWINGS

Other objects and aspects of the invention will become apparent from the following description of embodiments with reference to the accompanying drawings in which.

DETAILED DESCRIPTION OF THE PREFERRED EMBODIMENTS

Figure 1:
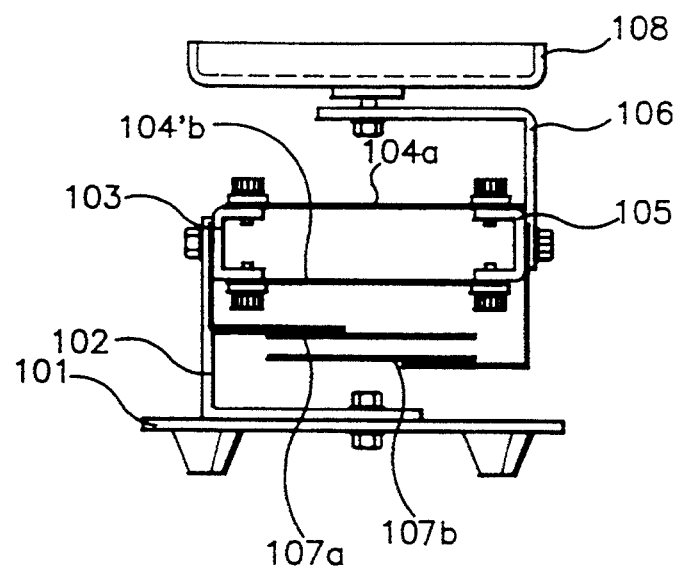
FIG. 1 is a sectional view of the capacitance type weight sensing device adapted to a conventional microwave oven.
Figure 2:
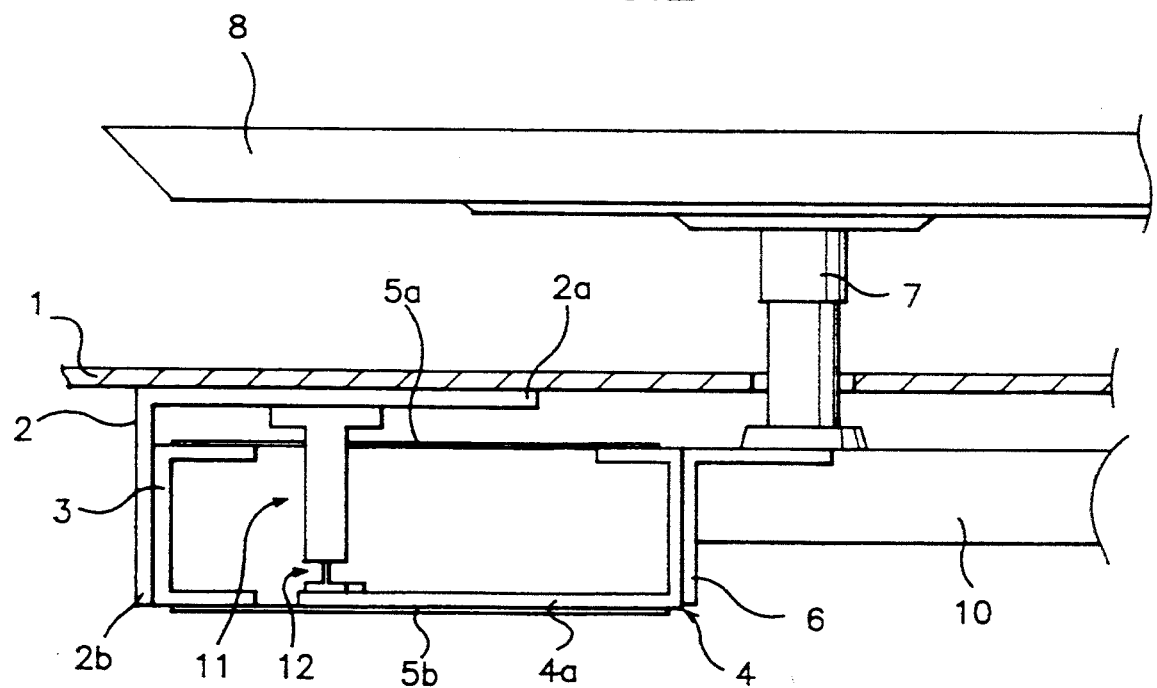
FIG. 2 is a partial sectional view of a food weight sensing device for a microwave oven in accordance with the present inventions
Figure 3:
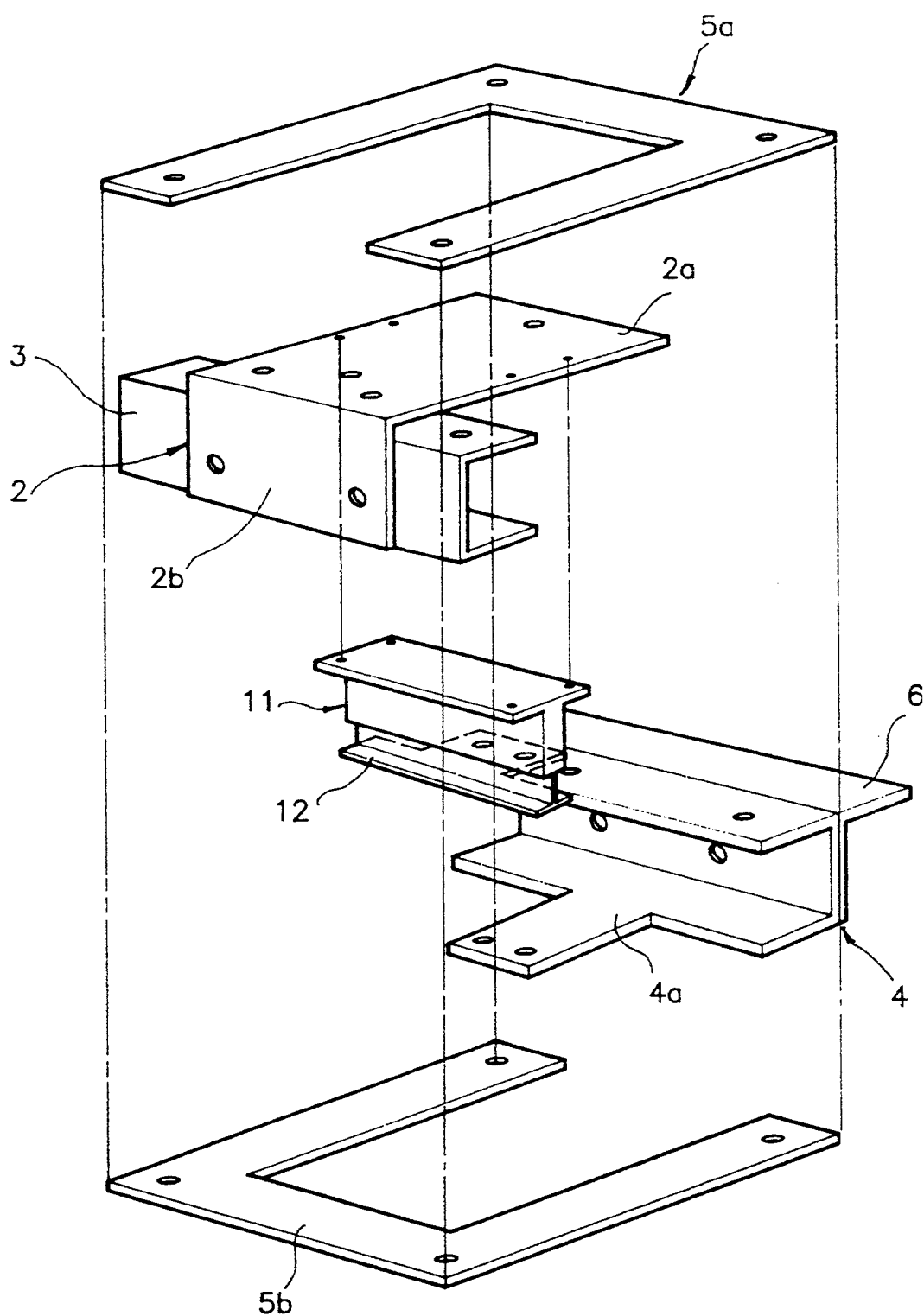
FIG. 3 is a partial exploded perspective view of the device shown in FIG. 2.

FIG. 2 is a partial sectional view of a food weight sensing device for a microwave oven in accordance with the present invention. FIG. 3 is a partial exploded perspective view of the device shown in FIG. 2. As shown in FIGS. 2 and 3, at one side of a base plate 1 of the microwave oven, a bracket 2 having a horizontal portion 2a and a vertical portion 2b is fixedly mounted to the lower surface of the base plate 1. A fixed spacer 3 is fixedly mounted to the inner surface of the vertical portion 2b of bracket 2. The fixed spacer 3 has a 90°-turned U shape with a pair of upper and lower horizontal portions vertically spaced from each other. To the upper and lower horizontal portion of the fixed spacer 3, a pair of plate springs 5a and 5b are fixedly mounted at their one ends in a cantilever manner, to extend horizontally in parallel to each other. A movable spacer 4 is fixedly mounted to respective other ends of the plate springs 5a and 5b, so as to face the fixed spacer 3. The movable spacer 4 has a 270°-turned U shape including a short upper horizontal portion and a long lower horizontal portion. In FIG. 2, the long lower horizontal portion of the movable spacer 4 is designated by the reference numeral 4a.

A load support bracket 6 is also fixedly mounted to the vertically extending outer surface portion of movable spacer 4. The load support bracket 6 serves to rotatably support a rotation shaft 7 which extends upwardly from the bracket 6 through the base plate 1 and supports a tray 8 at its upper end. The load support bracket 6 also support a gear box 10 for rotating the rotation shaft 7.

Between the horizontal portion 2a of bracket 2 and the lower horizontal portion 4a of movable spacer 4, variable weight sensing means is provided, which is adapted to sense the weight of an object according to a variation in overlapping area between two electrode plates.

Figure 4:
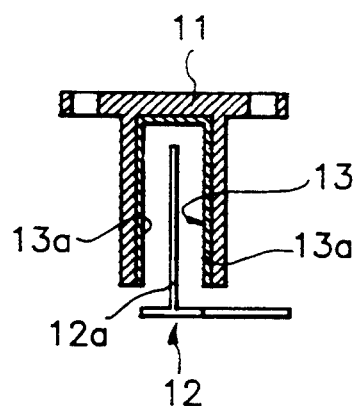
FIG. 4 is a sectional view of variable weight sensing means of the device shown in FIG. 2.
Figure 5:
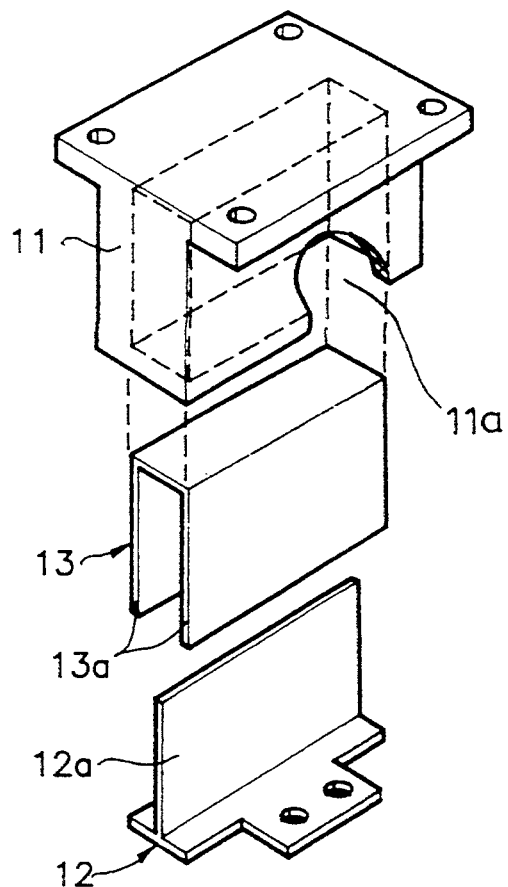
FIG. 5 is an exploded perspective view of the means shown in FIG. 4.

Referring to FIGS. 4 and 5, there is illustrated a construction embodying such variable weight sensing means. As shown in FIGS. 4 and 5, the variable weight sensing means comprises a weight sensing fixed member 11 fixedly mounted to the horizontal portion 2a of the bracket 2 disposed beneath the base plate 1. The weight sensing fixed member 11 has an actuating chamber 11a opened at one end of the weight sensing fixed member 11 and having a predetermined depth. In the actuating chamber 11a, a fixed electrode 13 is disposed, which has a fixed electrode plate 13a attached to the inner surface of weight sensing fixed member 11 defining the actuating chamber 11a. The variable weight sensing means also comprises a movable electrode 12 fixedly mounted to the lower horizontal portion 4a of movable spacer 4. The movable electrode 12 has a movable electrode plate 12a inserted into the actuating chamber 11a through one end of the weight sensing fixed member 11. The movable electrode plate 12a can slide vertically in the actuating chamber 11a, so as to vary the overlapping area between the movable electrode plate 12a and the fixed electrode plate 13a.

Operation of the food weight sensing device with the above-mentioned construction will now be described.

Figure 6A:
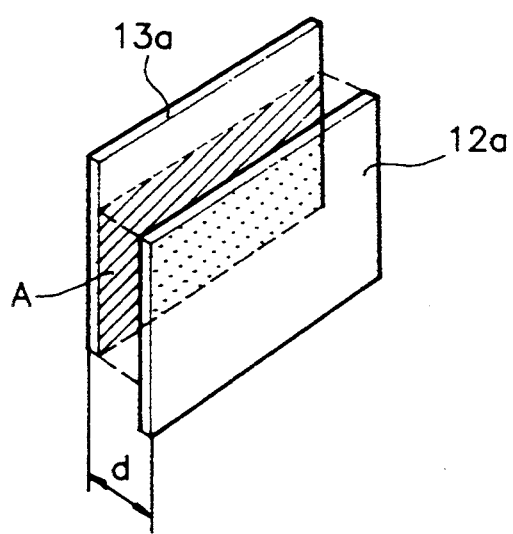
FIG. 6A is a schematic perspective view of a fixed electrode plate and a movable electrode plate of the device according to the present invention, showing an idle condition that no food is laid on a tray.

Under an idle condition that no food is laid on the tray 8, the distance d between the movable electrode plate 12a and the fixed electrode plate 13a is maintained at a certain value, as shown in FIG. 6A. At this state, the overlapping area A between the movable electrode plate 12a and the fixed electrode plate 13a is also maintained at a certain value.

As a food to be cooked is laid on the tray 8, that is, under a load condition, the load support bracket 8 supporting the tray 8 moves downwardly due to the weight of food, together with the movable spacer 4 to which the load support bracket 8 is fixed. Accordingly, the movable electrode 12 fixed to the horizontal portion 4a of movable spacer 4 moves downwardly.

Figure 6B:
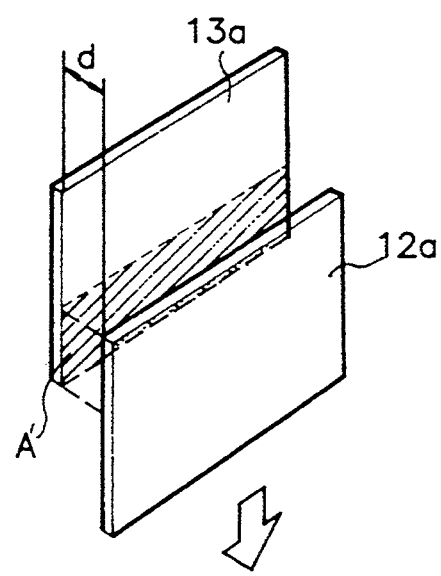
FIG. 6B is a schematic perspective view similar to FIG. 6A, showing a load condition that a food is laid on the tray.

As a result, the movable electrode plate 12a moves downwardly in the actuating chamber 11a, so that the overlapping area A is reduced from that of the idle condition, as shown in FIG. 6B, thereby causing the capacitance to be decreased.

At this time, the distance d between the movable electrode plate 12a and the fixed electrode plate 13a is constantly maintained without any variation, in that the movable electrode plate 12a moves vertically. In particular, it is possible to prevent an erroneous measurement caused by external factors, in that the movable electrode plate 12a and the fixed electrode plate 13a are contained in the actuating chamber 11a of the weight sensing fixed member 11.

Figure 7:
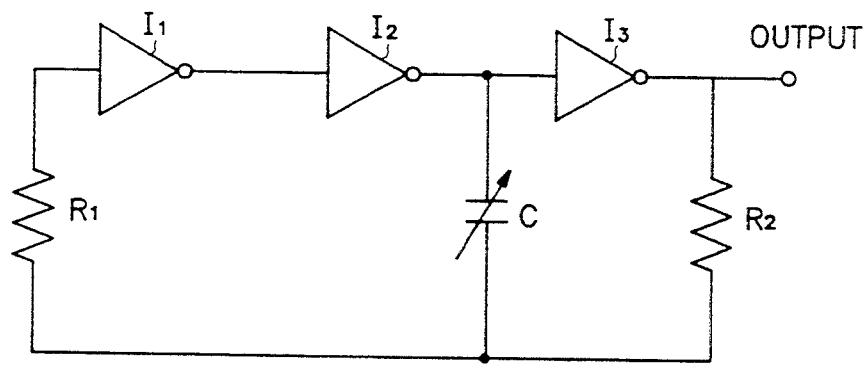
FIG. 7 is a circuit diagram of a frequency converter of the device according to the present invention.

The variation in capacitance is converted into a frequency by a frequency converter. As shown in FIG. 7, the frequency converter may comprise three inverters $I_1$, $I_2$ and $I_3$ connected in series, two resistors $R_1$ and $R_2$ connected in series at both ends of the connected inverters, and a variable condenser C constituted by the movable electrode 12 and the fixed electrode 13. In the illustrated case, the variable condenser C is connected between a junction of the inverters $I_2$ and $I_3$ and a junction of the resistors $R_1$ and $R_2$.

Where the frequency converter is used, a converted frequency can be expressed by the following equation (2):

$$f = \frac{1}{2\pi R_2 C} = \frac{1}{2\pi R_2 \times \frac{\epsilon A}{d}} \quad (2)$$

From the equation (2), it can be found that the frequency f is varied, in reversely proportional to the overlapping area A between electrode plates.

Figure 8:
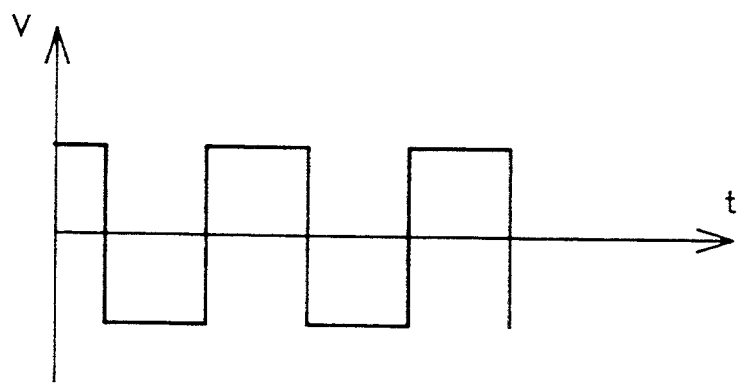
FIG. 8 is a waveform diagram of a signal outputted from the frequency converter of the device according to the present invention.
Figure 9:
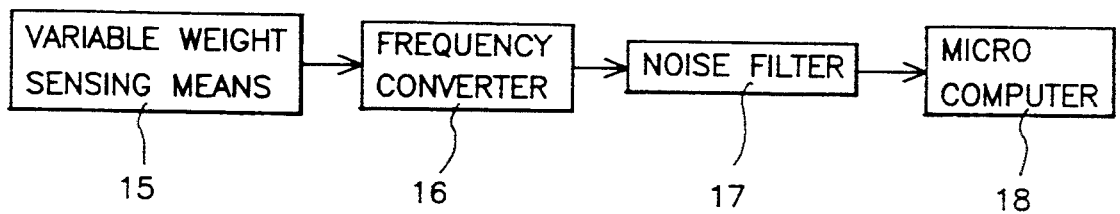
FIG. 9 is a block diagram illustrating a signal transfer path in the device according to the present invention.

The variable weight sensing means which is designated by the reference numeral 15 in FIG. 9 outputs a signal indicative of the sensed variation in capacitance. This output signal is converted into a frequency signal having a waveform shown in FIG. 8, by the frequency converter which is designated by the reference numeral 16 in FIG. 9 and may have the arrangement shown in FIG. 7.

As shown in FIG. 9, the frequency signal from the frequency converter 16 is then sent to a microcomputer 18 (or an operating unit), via a noise filter 17.

The microcomputer 18 reads the frequency signal indicative of the variation in capacitance based on the variation in overlapping area between electrode plates and derives the weight of object from the read frequency signal.

Figure 10:
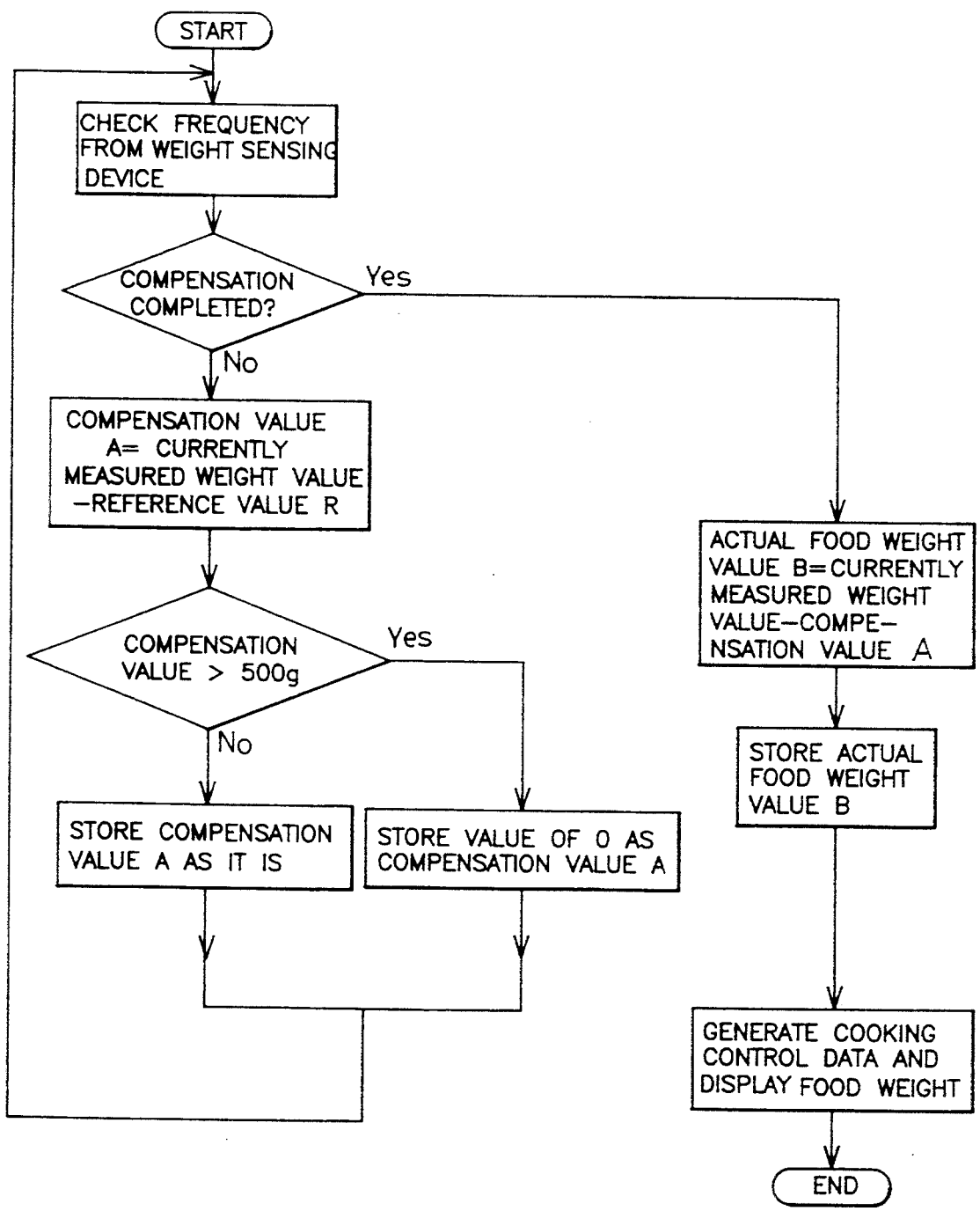
FIG. 10 is a flow chart illustrating a procedure for sensing the weight of an object to be measured by the device according to the present invention.

FIG. 10 is a flow chart illustrating a typical weight sensing method using the microcomputer 18.

An error of the weight sensing device itself caused by a superannuation of the weight sensor device or an environmental variation is detected. The error is determined and compensated, based on a food weight currently measured and predetermined reference values. An actual weight value is derived after compensating the error, that is, driving a compensation value. This actual weight value is then displayed.

The compensation value A is a value obtained by deducting a first predetermined reference value R from the currently measured weight value.

The compensation processing operation of the microcomputer 18 for the weight sensing device is carried out in the following manner. Where the compensation value A is not less than a second predetermined reference value (in the illustrated case, 500 g), it is determined that the generated error is not caused by an error of the weight sensing device itself, but caused by an application of electric power under a condition that a load has been laid on the tray. In this case, a value of 0 is stored as the compensation value A. For a compensation value A of not more than the second predetermined reference value, namely, 500 g, it is stored as it is. After the compensation operation, the routine returns to the initial state.

Thereafter, the microcomputer 18 deducts the stored compensation value A from the currently measured weight value, since the weight sensing by the weight sensing device and the compensation for the weight sensing device have been made. The result obtained from the deduction is stored as the actual food weight value B.

Based on the actual food weight value B, the microcomputer 18 makes cooking control data. The actual food weight value B is also displayed on a display unit.

Thus, the microcomputer 18 is used as compensation means for compensating an error in food weight value occurring due to external factors.

As apparent from the above description, the present invention provides a food weight sensing device for a microwave oven, which comprises a fixed electrode plate and a movable electrode plate which vary in overlapping area, according to a vertical movement of a movable spacer caused by the weight of an object to be measured. A capacitance signal indicative of the variation in overlapping area is converted into a frequency signal, so as to sense precisely the weight of object. The food weight sensing device has a simple construction wherein the electrode plates contained in a weight sensing fixed member, so as to be protected from external, thereby preventing a malfunction caused by external factors and contributing a compactness.

Although the preferred embodiments of the invention have been disclosed for illustrative purposes, those skilled in the art will appreciate that various modifications, additions and substitutions are possible, without departing from the scope and spirit of the invention as disclosed in the accompanying claims.

What is claimed is:

1. A food weight sensing device for a microwave oven comprising:

a fixed spacer fixedly mounted beneath a base plate of said microwave oven at one side of said base plate, by a bracket fixed to the base plate;

a movable spacer fixedly mounted to a load supporting bracket supporting a tray of the microwave oven such that it is horizontally spaced a predetermined distance from said fixed spacer, to face the fixed spacer, said movable spacer being vertically movable due to the weight of an object laid on said tray for measuring the weight and having a horizontal supporting member extending from its lower portion;

resilience means disposed between the fixed spacer and the movable spacer and adapted to apply a resilience force to the movable spacer against said vertical movement of the movable spacer; and variable weight sensing means having a pair of overlapping electrode plates, one of which is attached to said bracket for supporting the fixed spacer and the other one being attached to said horizontal supporting member such that an overlapping area between said electrode plates is varied, depending on the vertical movement of the movable spacer, said variable weight sensing means being adapted to sense the weight of said object, based on a capacitance value obtained by the variation in overlapping area.

2. A food weight sensing device in accordance with claim 1, wherein said variable weight sensing means comprises:

a weight sensing fixed member fixedly mounted beneath said base plate by said bracket for supporting said fixed spacer, said weight sensing fixed member having a vertically extending actuating chamber opened at one end thereof;

a fixed electrode disposed in said actuating chamber and having a fixed electrode plate which is one of said overlapping electrode plates, said fixed electrode plate being attached to an inner surface of the weight sensing fixed member defining the actuating chamber; and a movable electrode fixedly mounted at its lower portion to said horizontal supporting member of said movable spacer and having a movable electrode plate which is the other one of the overlapping electrode plates, said movable electrode plate being vertically movable through the actuating chamber while maintaining a parallel state with the fixed electrode plate through said one end of the weight sensing fixed member.

3. A food weight sensing device in accordance with claim 1, wherein said resilience means comprises a pair of parallel plate springs disposed between said fixed spacer and said movable spacer.

4. A food weight sensing device in accordance with claim 1, further comprising:
- a frequency converter for converting said capacitance value from said variable weight sensing means into a signal indicative of a frequency corresponding to the capacitance value;
- a noise filter for removing a noise from said signal outputted from said frequency converter; and
- an operating unit for deriving a weight value based on a frequency signal outputted from said noise filter, so that an actual weight value of the object is derived.

5. A food weight sensing device in accordance with claim 4, further comprising:
- compensation means for deriving a compensation value by deducting a first predetermined reference value from a currently measured weight value and for determining an actual weight value by a value obtained by deducting the compensation value from the currently measured weight value when the compensation value is less than a second predetermined reference value and by the currently measured weight value when the compensation value is not less than said second predetermined reference value.

6. A food weight sensing device in accordance with claim 5, wherein said second predetermined reference value is 500 g.

* * * * *